Sept. 20, 1966 H. WEINRICH ET AL 3,273,422
MULTIPLE SPEED TRANSMISSION
Filed Nov. 1, 1963 3 Sheets-Sheet 1

Fig. 1

HELLMUT WEINRICH
GUNTHER PAULSEN
HERBERT MULLER

Strauch, Nolan & Neale

Fig. 2

HELLMUT WEINRICH
GUNTHER PAULSEN
HERBERT MULLER

Strauch, Nolan & Neale

United States Patent Office 3,273,422
Patented Sept. 20, 1966

3,273,422
MULTIPLE SPEED TRANSMISSION
Hellmut Weinrich and Günther Paulsen, Heidenheim (Brenz), and Herbert Müller, Pinneberg, near Hamburg, Germany, assignors to Voith-Getriebe KG., Heidenheim (Brenz), Germany, a corporation of Germany
Filed Nov. 1, 1963, Ser. No. 320,651
12 Claims. (Cl. 74—752)

This invention relates to a multiple speed transmission and more particularly to an automatic multiple speed transmission having a Foettinger type fluid drive for transmitting power in at least one of the transmission speed ranges.

The transmission of this invention is especially adapted for use in vehicles powered by combustion engines and provides a plurality of automatic progressive shifts in gear ratio in both forward and reverse drives. This automatic shifting operation of the transmission is customarily and conveniently referred to as shifting between a low gear and one or more progressively higher gears. However, it will be appreciated that reference to the transmission shifting operation as automatically shifting, for example, from low to high gear is not restricted to bodily displacing transmission gears, but rather primarily pertains to a change in gear ratio. Low gear, it is clear, corresponds to the low speed range of transmission operation, while high gear corresponds to the high speed range of the transmission. Advantageously, the transmission of the present invention also has in intermediate speed so that the transmission automatically upshifts from low to intermediate to high gear and downshifts automatically from high to intermediate to low gear in response to different predetermined speeds of one of the transmission power driven parts. Reversal in the direction of rotation of the transmission power output shaft of the invention is selectively accomplished by operating a manual shift lever.

In automatic multiple speed transmissions prior to this invention, reversal of the direction of power output shaft rotation cannot be effected during operation if the transmission is operating in either forward or reverse because either the driving transmission power train parts for obtaining the other direction of rotation would not engage at all, or because reversal of the direction of rotation would damage the transmission or produce objectionable shocks. To prevent reversal of rotation by selectively actuating the reversing shift lever, these prior art transmissions customarily incorporate simple locking or interlocking safety mechanisms. If the shift lever is actuated when the transmission is operating at any of its forward or reverse speeds, these safety mechanisms would require the operator of the vehicle to actuate it again after shifting the transmission to neutral. Only then would actuation of the reversing lever be effective to reverse the transmission drive.

In addition to these locking and interlocking safety mechanisms, previously known transmissions frequently incorporated a mechanism which permits reversal of direction by actuation of the reverse shifting lever during forward or reverse drive, but which prevents the reversal of direction from becoming effective until the transmission is manually shifted into a neutral or idle position. In a simple reversing transmission, it is also a known expedient to reduce the input speed of the transmission during the reversing operation by applying a brake along with actuation of the reverse shift lever. These types of simple transmissions, however, are not of the type providing a plurality of progressive automatic speed shifts in either the forward or reverse drive.

With prior transmissions, consequently, it is not possible to reverse the direction of travel, for example, from the high gear in forward drive automatically into reverse drive by means of a single simplified shifting action.

Accordingly, it is a primary object of this invention to provide a novel automatic multiple transmission in which reversal of the drive is selectively and rapidly effected by a single manual operation regardless of the speed range in which the transmission is operating. This manner of shifting is very advantageous in such vehicles as caterpillars which must not only move forward and backward in a like manner, but which must also change direction of travel quickly and effectively without manually throttling the engine.

In the transmission of the present invention, up and down shifting is automatically effected in either forward of reverse drive by a plurality of speed shifting devices. These speed shifting devices are successively responsive to different predetermined speeds of a power output shaft member in the transmission to brake or rotate different components of the transmission power train and thereby change the drive gear ratio. The reversing mechanism of the invention is effective in reversing the transmission drive to automatically render these shifting devices inoperative for all transmission speeds except the lowest speed before effecting the reversal of the drive. If the transmission is in high gear when the reversing lever is operated, the reversing mechanism will, as a result, automatically downshift the transmission to low gear so that reversal occurs at the lowest transmission speed. In addition, the invention contemplates an interlock between the reversing mechanism and the engine power control throttle to assure that the power output of the engine is sufficiently reduced before effecting the reversal of the transmission drive.

With the transmission of this invention, therefore, quick and reliable reversal is achieved without dependency on the skill of the operator. Errors in shifting are thus avoided to prevent interruption in the controlled operation of the vehicle.

Thus, another object of this invention is to provide an automatic multiple speed transmission having a reversing mechanism which automatically effects a downshift from high to low gear before permitting a reversal in the direction of the transmission driven shaft.

A further object of the invention resides in the provision of a mechanism operably interconnecting the throttle or power control member of the driving engine and the reversing mechanism in the preceding object, whereby the power output is reduced to a low speed range before reversal of the transmission drive is allowed to take place.

Further objects of the invention will appear as the description proceeds in connection with the appended claims and annexed drawings wherein:

Figure 1:
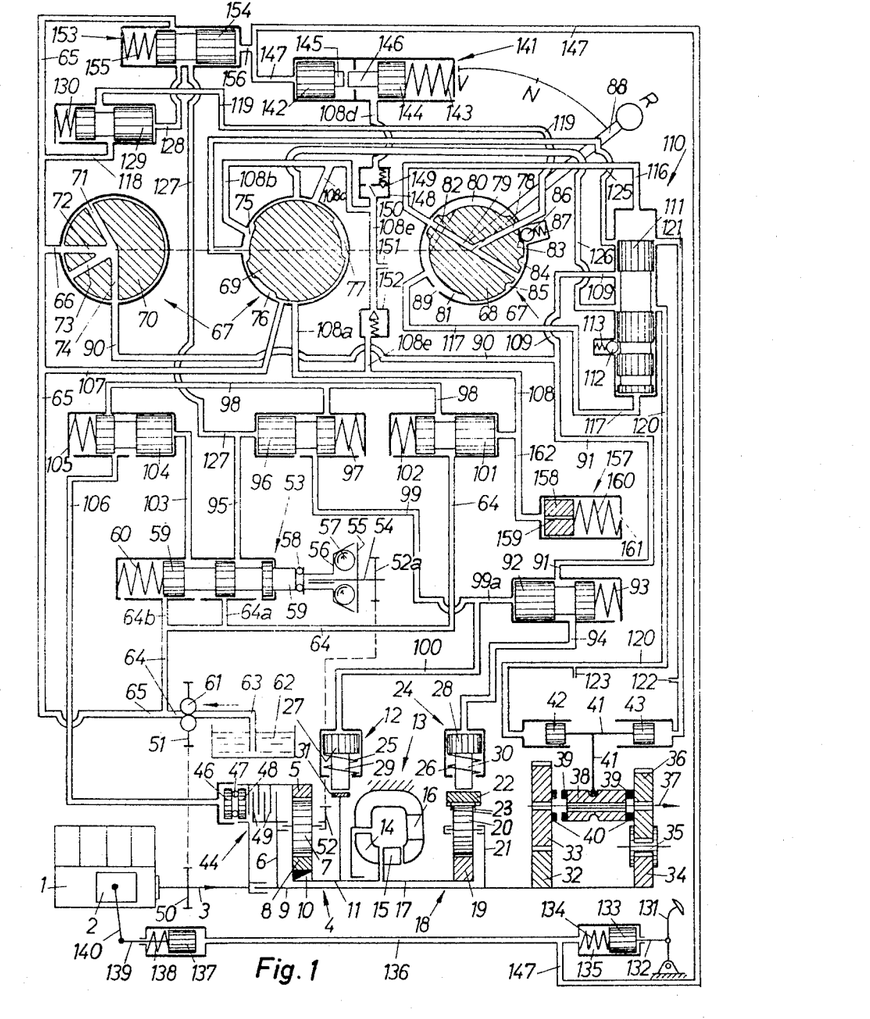
FIGURE 1 is a diagrammatic view of a vehicle torque converter transmission constructed according to a preferred embodiment of the invention and having three speeds forward and three reverse and incorporating a special automatic speed changing and reversing mechanism.

Referring now to FIGURE 1, an internal combustion engine 1 having a power control member 2 is connected by an output shaft 3 to drive an outer gear 5 of a power-dividing planetary gear set 4. Planet set 4 is provided with a planet gear carrier 6 and planet gear 7 which are connected for unitary rotation with a central shaft 9. Gear 7 is rotatably mounted on carrier 6 and meshes with gear 5. A sun gear 8 forming a part of gear set 4 and meshing with gear 7 is connected by way of an idler 10 to rotate with a hollow shaft 11.

With continued reference to FIGURE 1, a fluid torque converter 13 is provided with a pump wheel 14 which is non-rotatably keyed to shaft 11. A turbine wheel 15 is non-rotatably driven by the energy produced by pump wheel 14 is non-rotatably mounted on a hollow shaft 17. Shaft 11 is capable of being braked by a brake 12. A guide wheel 16 forming a part of converter 13 is stationary and is so arranged in the toroidal fluid passageway of converter 13 that the working liquid from pump wheel 14 flows through guide wheel 16 to the inlet of turbine wheel 15. The blading of these parts are so constructed that pump wheel 14 and turbine wheel 15 rotate in opposite directions (reversing converter).

With the transmission construction thus far described, it will be appreciated that the power delivered by engine 1 is divided by gear set 4 into two paths. One power path is through shaft 9; the other power path is through shaft 11; pump wheel 14, turbine wheel 15 and shaft 17. These two power paths are reunited in a further planetary gear set 18 having a sun gear 19 non-rotatably secured on hollow shaft 17. A planet gear carrier 21 forming a part of gear set 18 and rotatably carrying a plurality of planet gears 20 is non-rotatably secured on shaft 9. The outer gear 22 of the planetary gear set 18 is mounted on and meshes with planet gears 20. Two rings 23 retain outer gear 22 axially in place. Gear 22 is capable of being braked by a brake 24.

Brakes 12 and 24 are respectively provided with speed changing pistons 27 and 28 which are respectively operated to braking position by application of fluid pressure in opposition to the force exerted by springs 25 and 26. Rams 29 and 30 respectively connected to the speed changing pistons 27 and 28 are adapted to press respectively against a flange 31 mounted on hollow shaft 11 and against outer gear 22, and thus brake rotation of these parts.

Shaft 9, as shown in FIGURE 1, is connected with an output shaft 37 by way of a pair of meshing gears 32 and 33 and three seriately meshing gears 34, 35 and 36. Gears 32 and 34 are non-rotatably keyed to the shaft 9, and the gears 33 and 36 are freely rotatably mounted on shaft 37. An axially displaceable sleeve 38, fixed against rotation on shaft 37, has friction elements 39 on its opposite ends. By axially shifting sleeve 38 in opposite directions, elements 39 are pressed alternately against the friction elements 40 on gears 33 and 36. Thus, either gear 33 or gear 36 is connected to rotate with shaft 37 to respectively provide forward and reverse drives. The axial movement of sleeve 38 is effected by a shifting rod 41 engaged by opposed reversing pistons 42 and 43 which are alternately acted on by fluid pressure.

Gear 5 is selectively coupled to planet gear carrier 6 by a multiple disc clutch 44 having pressure discs 49. To engage clutch 44 and thereby drivingly connect shaft 3 to carrier 6, a non-rotatable speed piston 46 is axially shiftable by application of fluid pressure to press discs 49 together by way of bearing balls 47 and by way of a piston 48 which rotates with outer gear 5. Thus, a positive drive connection between gear 5 and carrier 6 is established.

With the foregoing construction, the transmission of this invention is shiftable to the following speeds both for forward and reverse directions: a lower speed through the torque converter, a second mechanical speed through shaft 9, and a third mechanical speed. To shift to the lower speed, only brake 24 is operated and idler 10 is locked. To shift to the second mechanical speed, brake 12 is operated, and idler 10 and brake 24 are released. To shift to the third speed, brake 12 and clutch 44 are actuated and idler 10 is released.

The individual shifting operations are effected automatically and in response to the rotational speed of planet carrier 6 whose speed is proportional to that of output shaft 37. To accomplish this a speed governor 53 is driven by the planet carrier 6 by way of a pair of spur gears 52 and 52a. A plate 55 is fixedly mounted on a shell 57 which is keyed to but is axially movable on a shaft 54 of governor 53. Gear 52a is fixed to shaft 54. Between plate 55 and a plate portion 56 of shell 57 are disposed inertial weights comprising balls which, depending on the speed of shaft 54, are flung outwardly a greater or lesser distance by centrifugal force. The inner end of shell 57 axially engages a set of ball bearings 58 which bear against the opposed end of a piston 59. Piston 59 is biased into engagement with bearings 58 by a spring 60. Thus, axial displacement of shell 57 in response to rotation of shaft 54 axially shifts piston 59 against the force of spring 60. Piston 59 is formed with a pair of axially spaced portions of reduced diameter so arranged to either open or close a pair of fluid pressure lines 64a and 64b which form a part of the hydraulically operating control means to effect the automatic shifting of the transmission. Hydraulic fluid under pressure is supplied by a gear pump 61 which is driven by the motor drive shaft 3 through meshing spur gears 50 and 51 and which draws the hydraulic fluid from a reservoir 62 through a line 63.

In the lower (hydraulic) speed range, governor 53 does not open either line 64a or line 64b. But through lines 64, 65 and 66, through channels 72 and 74 of a direction reversing valve 67 and through lines 90 and 91, hydraulic fluid is transmitted to a control piston 92 during the lower speed range. Since control piston 92 is not subjected to pressure at the low speed, a spring 93 axially urges piston 92 into its extreme end position shown in FIGURE 1. The pressure medium flowing out of line 91, flows through the cylinder receiving piston 92, and through a line 94 to exert pressure on piston 28 of brake 24. By exerting this pressure on piston 28, brake 24 is actuated to hold outer gear 22 against rotation. Thus, the lower speed is established in either the forward or reverse direction depending on which of the two pistons 42 and 43 is subjected to pressure.

The direction of rotation in the low speed range is established by a lever 88 of the direction reversing valve 67. As shown in FIGURE 1, the rotatable shifting spool of valve 67 has three axially spaced shifting planes, respectively comprising the control discs 68, 69, and 70. Control discs 68, 69 and 70 are rigidly joined to each other so that no relative rotation is possible as schematically indicated by the dotted lines. Discs 68, 69, and 70 are operated in unison by lever 88.

The manner in which the pressure medium is circulated to piston 42 or 43 when the lever is set at V (forward) or R (reverse) will be explained later on. Here it will merely be said that the above-mentioned connection of line 66 to line 90 through the channels 72 and 74 of the control disc 70 is effected by shifting lever 88 at V. When the lever 88 is set at R, on the other hand, the lines 66 and 90 are connected by channels 71 and 73 of the same control disc. As a result, piston 28 of brake 24 is subjected to fluid pressure in both positions V and R of lever 88. Only when lever 88 is set at N (the neutral or idle position) is brake 24 not operated. In this neutral position, therefore, the low speed (and the higher speeds as well) is not established, since no connection then exists between lines 66 and 90.

When the speed of the output shaft increases, the inertia weights of governor 53 fly outwardly, moving the piston 59 toward the left and first to the position in which line 64a is opened by piston 59. At this position, the pressure medium flows through a line 95, encounters a control piston 96 and axially pushes it into its right hand end position against the force of a spring 97. Then the pressure medium can flow from a line 98 through lines 99 and 100 to brake 12 and force the piston thereof downwardly to prevent rotation of shaft 11. As a result, the second (mechanical) transmission speed is established. During this second speed range, brake 24 is released since the pressure medium in line 99 passes through line 99a, exerts pressure against control piston 92 to shift piston 92 for blocking the connection between lines 91 and 94.

The pressure medium flows into line 98 from the pump 61 through line 64 and a cut-off piston 101. Since cut-off piston 101 is not under pressure at this stage in the operation, a spring 102 biases it to its extreme right-hand position whereby fluid communication is established between lines 64 and 98.

When the speed of the output shaft 37 increases further, the inertia weights of the governor 54 are thrown still further outwardly to shift piston 59 further to the left, thereby establishing fluid communication between line 64b and a line 103. In this position the pressure medium establishes the third transmission speed by urging a control piston 104 toward the left against the bias of a spring 105. This movement of piston 104 opens line 98, which is supplied with pressure medium through line 64. Thus, piston 46 is subjected to pressure through a line 106 to engage clutch 44 and thereby establish the third transmission speed.

The control elements (control pistons 92, 96, 104) for shifting speeds and the speed shift elements themselves (speed shift pistons 27, 28, 46) are therefore effected hydraulically and automatically in response to the speed of a driven member in the transmission.

In the following, reversal while the drive is stopped, i.e., shifting the lever from N to V or from N to R, will now be considered. It should be noted that if the problem of being able to operate selectively the lever 88 under all of the transmission operating conditions did not exist, the means for reversing the direction of rotation would be constructed otherwise than in the present case. For example, in such case the direction lever 88 could operate the reversing pistons 42 and 43 directly to obtain the forward or reverse drive, and not through an intermediate member as in the present case.

When lever 88 is set in its neutral position at N, a ball 86, under the bias exerted by a spring 87, engages the bottom of a recess 84. With this setting the pressure medium flows through line 65 and a branch line 107, through a recess 76 in control disc 69 and through a control line 108a and line 108, to exert a pressure pushing cut-off piston 101 toward the left. Axial displacement of piston 101 to the left blocks fluid flow to the feed lines connected to brake 12 (second speed) and to piston 46 (third speed). Lines 90 and 91, as already mentioned briefly above, are also without pressure because of the position of control disc 70. Therefore, none of the speeds can be effective in the neutral position of the lever 88.

When the lever 88 is swung toward the right into the reverse position R, ball 86 engages a recess 83. As already described above, line 90 is now under pressure and therefore line 109 as well, which latter line leads to a reversing control member 110. Reversing control member 110 has a sequence piston 111 which can be subjected to pressure at both ends through lines 116 and 117. Depending on which end of sequence piston 111 is subjected to fluid pressure, it assumes the end position in which a ball 112, biased by a spring 113, engages one of the two recesses 114 and 115, thus retaining the sequence piston against further displacement. With lever 88 in reverse position R, the pressure medium passes from pressure line 65 through lines 118 and 119, through channels 78 and 79 of control disc 68, and through line 116 into the space above the sequence piston 111 to exert a pressure piston 111 downwardly. Line 109 is thereby connected with a line 120 leading to reversing piston 42 so that the latter is axially urged by fluid pressure toward the right. As a result, the reverse drive becomes effective through spur gears 34, 35 and 36. Conversely, when the lever 88 is set at V where ball 86 engages recess 85, pressure fluid is transmitted from line 119 through channel 79 and through line 117 to the lower end of the sequence piston 111. This fluid exerts a pressure to axially urge piston 111 to its upper position. As a result, line 109 is connected to a line 121 leading to reversing piston 43 which is consequently pushed to the left, whereby the forward direction of rotation becomes effective through the gears 32 and 33.

Metering openings 122 and 123 in lines 120 and 121 permit the escape of the pressure medium from the line connected to whichever of the reversing pistons 42 and 43 is not under pressure. Escape of the pressure medium from the side of sequence piston 111 that is not under pressure is effected through recesses 80 and 81 and through openings 82 and 89. Thus the pressure medium flows from line 117 through the bore 89 or from the line 116 through the recesses or openings 80, 81 and 89.

It should be mentioned, additionally, that the pressure medium leaving the control members as well as any leakage, is collected in the reservoir 62 in a manner not shown in detail.

In the following description, several elements embodying the inventive concept will be described and explained in connection with the parts already mentioned.

In addition to line 108a to the cut-off piston 101, two further lines 108b and 108c branch off from the control disc 69 of the direction reversing valve 67, and all of these lines 108a, 108b, and 108c connect to the common control line 108. Control disc 69, in addition to the already mentioned feed line 107, has connected thereto two more lines 125 and 126 which lead to it from reversing control member 110. These lines are so connected and, further, two more recesses 75 and 77 in the control disc 69 are so arranged that, on the one hand, in the lower end position of the sequence piston 111, the line 126 is connected to the line 109 and in the upper end position the line 125 is connected to the line 109; on the other hand, when lever 88 is set at V, lines 108c and 126 are connected via the recess 77 and, when the lever is set at R, lines 108b and 125 are connected, as shown, via the recess 75. Further, since lever 88 does not directly operate the sequence piston 111 which directly determines the direction of the drive, the position of lever 88 need not correspond positively to the associated position of sequence piston 111. That is, under certain conditions, with lever 88 in the position shown, at R, sequence piston 111 may also be in the upper end position (associated with the forward drive V). These special conditions are present when the shift is made from V to R or R to V while the second or third speed is effective for it is desired to avoid damage to the gearing or the like when such a reversal is made, at maximum speed, for example. Damage may occur if sequence piston 111 moves into the associated end position immediately upon operation of the lever 88.

Thus, to render the second or second and third speeds ineffective, when reversing while in one of the two higher speeds, cut-off piston 101 is operative and control line 108, as previously explained, is arranged between the direction reversing valve 67 and piston 101 to operate the latter. Control line 108 contains pressure fluid only when the position of the direction reversing valve 67 and the position of the reversing control member 110 correspond to different directions of travel. This development also resides in the fact that cut-off piston 101 is in operative connection with control pistons 96 and 104 for the higher speeds, and in such a manner that control pistons 96 and 104 for the higher speeds are ineffective when the piston 101 is under pressure. In accordance with this feature of the invention, there is no pressure in the control line 108 when the position of the lever 88 corresponds to that of the sequence piston 111. As shown in FIGURE 1, the sequence piston 111 and lever 88 both are in positions corresponding to reverse drive R. In this position cut-off piston 101 will not be under pressure and therefore the second and third speeds can be shifted automatically by means of the control pistons 96 and 104. The higher speeds will no longer be shiftable only when the positions of lever 88 and sequence piston 111 do not agree with each other, that is, when, in second or third speeds, lever 88 is set to the opposite direction of travel. Rendering the control pistons 96 and 104 ineffective when the cut-off piston 101 is under pressure can be accomplished in a different way, for example, by locking control pistons 96 and 104.

From the foregoing description, it is clear that the cut-off piston 101 shuts off the supply of pressure medium to the speed shifting pistons 27 and 46 for the higher speeds. Under such conditions, control pistons 96 and 104 can be controlled from governor 53. At the instant in which cut-off piston 101 is subjected to pressure, supply line 64 is shut off so that pressure medium is no longer available for operating brake 12 and disc clutch 44.

According to the invention, the reversing control has preliminary control lines 127 and 128 respectively connected to governor 53 to a preliminary control piston 129 and which are under pressure only when the rotational speed of output shaft 37 corresponds to the higher speeds. Pressure fluid in line 128 actuates preliminary control piston 129 against the bias of a spring 130. The reversing control also includes a line 119 connected between preliminary control piston 129 to direction reversing valve 67. Preliminary control piston 129 controls the flow of pressure medium through line 119 to direction reversing valve 67 in such a way that the flow of pressure medium is shut off only when there is pressure in the preliminary control lines 127 and 128, i.e., at the higher speeds. At the same time the reversing control includes the above-mentioned lines 116 and 117 connected between direction reversing valve 67 and sequence piston 111, which is displaceable to two end positions. The pressure medium is conducted by line 117 or line 116, depending on whether lever 88 is set to the position V or R respectively. This causes sequence piston 111 to be shifted to one or the other of its end positions when there is pressure in line 119. Therefore, lines 119 and 116 or lines 119 and 117 have fluid pressure only when preliminary control lines 127 and 128 are without pressure, whereupon sequence piston 111 is correspondingly displaced and the direction of drive is thereby changed. This signifies, conversely, that when the rotational speed of output shaft 37 corresponds to the higher speeds, the sequence piston 111 cannot be displaced and therefore a change in the direction of the drive cannot take place when the transmission is at high speed. Even when the vehicle is travelling downhill at high speed, without being in one of the higher gears, i.e., with lever 88 in the neutral positions N, the reverse direction of rotation cannot be established.

Since, in the transmission of FIGURE 1, control piston 96 for the second speed is also subjected to pressure via line 95 when the engine speed corresponds to the third speed, so that pressure exists in line 95 when the speed of output shaft 37 corresponds to the higher speeds, the control lines 127 and 128, which will have pressure at the higher speeds, are connected to line 95.

According to the invention, control piston 92 for the lower (hydraulic) speed is not directly controlled by governor 53 and is, for example, subjected to pressure at low speed (the control pistons 96 and 104 for the higher speeds are controlled directly). Control piston 92, however, is subjected to pressure against the force of spring 93 through a line 99a which has pressure against the force of spring 93 through a line 99a which has pressure only at the higher speeds. In this case, since control piston 92 is displaced against the spring bias only at the higher speeds, lines 91 and 94 must be connected with each other, when control piston 92 is not under pressure, for the purpose of operating brake 24 in the lower (hydraulic) speed. By means of a control of this kind for the lower speed, governor 53 is structurally simplified to the extent that only two positions (namely for the second and third speeds) are required for control instead of three positions corresponding to the three drive speeds.

It is also preferable that the automatic reversing means according to the present invention be supplemented by reducing the speed of the engine during the reversal process. As a result, the reversal is effected without shock, jarring or damage to the component parts of the transmission. To accomplish this, a device 141 is connected to control line 108 between direction reversing valve 67 and cut-off piston 101. Device 141 is operable to adjust power control member 2 to low power when there is pressure in control line 108. Since the control line 108 has pressure only when the positions of the direction reversing valve 67 and the reversing control member 110 correspond to different directions of travel, i.e., when lever 88 has been moved to the other direction of travel in the higher speed, the engine is throttled by providing a special throttle plate in the air suction line to the carburetor engine, or by adjusting the existing throttle plate or, in a diesel engine, by adjusting the fuel pump delivery to a small amount.

In the mechanism of FIGURE 1, power control member 2 is hydraulically operated. A pedal 131 is connected by a rod 132 to a piston 133 which is biased to the right by a spring 134. When the pedal 131 is depressed, piston 133 moves toward the left and forces the pressure medium out of a cylinder 135 receiving piston 133. Thus fluid pressure is exerted on a piston 137 to correspondingly move piston 137 to the left against the bias of a spring 138. Piston 137 is connected to adjust power control member 2 to high power through a rod 139 and a lever 140 pivotally connected to rod 139.

Device 141 further comprises a shifting piston 142 slidably received in a cylinder which is connected to line 136 by a line 147. Thus piston 142 is subjected to fluid pressure in control line 136 concomitantly with application of fluid pressure to piston 137. A stop piston 144 is axially urged by fluid pressure in control line 108 against the bias of a spring 143. Pistons 142 and 144 are so arranged with respect to each other and have such a working relationship that, when control line 108 is without pressure, stop piston 144 holds shifting piston 142 in the end position which is on that side of the shifting piston 142 that can be subjected to pressure. When there is pressure in control line 108, shifting piston 142 is freely displaceable, and no working pressure can be present in the control line 136 for operating the power control member 2. This means that when there is pressure in control line 108 (i.e., when the vehicle is being driven in one direction at one of the higher speeds and with the automatic shift in operation) and lever 88 is moved to the other direction, no pressure, as a result of the displacement of shifting piston 142, can be built up in control line 136. As a result, piston 137 cannot move and power control member 2 can be set only at low power or even at idle. If no pressure exists in control line 108, spring 143 urges stop piston 144 toward the left and thus holds shifting piston 142 in its left end position. When pedal 131 is depressed, the pressure in line 136 can no longer move shifting piston 142 because spring 143 prevents it. Thus, piston 137 is moved and power control member 2 is operated. It is clear that spring 143 must be so dimensioned that movement of shifting piston 142 requires a greater force than movement of piston 137.

The arrangement of shifting piston 142 and stop piston 144 shown in FIGURE 1 provides for a simplified construction requiring minimum space. In this arrangement, shifting piston 142 and stop piston 14 4are axially aligned. Pistons 142 and 144 are respectively provided with projections 145 and 146 capable of stopping shifting piston 142. Stop piston 144 is subjected to pressure on the side of projections 145 and 146.

In order that, on the one hand, power control member 2 is quickly adjusted to low power (i.e., that stop piston 144 is moved quickly to the right) and that, on the other hand, power control member 2 is moved more slowly to the position corresponding to the position of the gas pedal 131 (i.e., that stop piston 144 is moved more slowly to the left so that no shocks or abrupt changes of speed occur), a back-pressure valve 148 with a spring-loaded ball 149 and a throttle opening 150 is disposed in line 108d. By this means the pressure medium can flow quickly from the line 108e to the stop piston 144, ball 149 being lifted and an opening cleared for fluid flow. But the pressure medium can flow back only slowly through throttle opening 150 since ball 149 will be seated to close the other opening. A further throttle opening 151 allows the pressure medium flowing through to pass into the discharge to reservoir 62.

Since power control member 2 will be influenced during reversal of direction only when the lever 88 is set at R or V (at which time line 108b or 108c has pressure), but never when lever 88 is set on N (idling) (at which time the line 108a is under pressure), it is preferable that pedal 131 is effective without such influence during idling. The pressure in line 108a therefore may not be transmitted through lines 108e and 108d to the stop piston 144. To accomplish this, a conventional check valve 152 is disposed in line 108e to permit the pressure medium to pass only in a downward direction as viewed from FIGURE 1.

The effect of the above-described automatic reversing mechanism is that the reversal is not effected at the higher speeds but only at the lower (hydraulic) speed, and that this is accomplished with the engine throttled, i.e., at the low speed range of the engine. However, it can happen that the reversal is made with open throttle at the lower (hydraulic) speed. Considerable shock to the gearing can result in such a case. To avoid this disadvantage the above-described control mechanism for reversing at one of the higher speeds can be used extensively at the same time. As in the case of reversal at one of the higher speeds, it is preferable that reversal at the lower speed is effected only when the power control member is set at partial load or even at idle. For this reason a reverse locking mechanism 153 operated by power control member 2, is employed for the lower speed and is so constructed that, when power control member 2 is set above the idling speed and when operating at the lower speed, lines 119, 116 and 117 for operating the reversing control member 110 are closed. In the mechanism of FIGURE 1, reverse locking mechanism 153 is advantageously provided with a piston 154 which is urged by fluid pressure in control line 136 against the bias of a spring 155. This fluid pressure serves to operate power control member 2 and is supplied through line 147 and a line 156. Piston 154 controls the flow through the preliminary control lines 127 and 128 for operating preliminary control piston 129 and also controls flow through line 65 which is constantly under pressure. This is done in such a way that the flow through line 128 for operating preliminary control piston 129 is shut off only when there is pressure in control line 136, which flow is otherwise unrestrained. In addition, preliminary control piston 129 is subjected to pressure by fluid supplied through line 65 only when control line 136 is without pressure. Since preliminary control piston 129 controls fluid flow through lines 119, 116 and 117 which serve to operate reversing control member 110, control member 110 is controlled at the same time by the fluid pressure in line 128. This is done in such a way that when there is pressure in line 128, piston 111 of the reversing control member 110 cannot be displaced and therefore no reversal can take place. However, pressure in line 128 and therefore prevention of reversal can, in accordance with the above, occur only when pedal 131 is depressed or, in the absence of pressure on pedal 131, when the engine speed (with pressure in line 127) corresponds to the third speed. In the remaining case, that is, when pedal 131 is not operated or when pedal 131 is operated while the automatic reversing mechanism is functioning (with pressure in line 108), reversal is blocked through line 119.

It can also occur that, during reversal (that is, while reversing pistons 42 and 43 are being moved from one end position into the other), in spite of shifting power control member 2 down, the engine and its associated driven parts will rotate at a speed so high that governor 53 responds to condition the system for the second speed. However, this must absolutely be avoided, since the transmission gearing would undergo a severe shock. To avoid this condition, an accumulator 157 for the pressure medium is connected by a line 162 to control line 108. Accumulator 157 comprises a piston 158 which is subjected on the left side to pressure in control line 108 and accordingly is urged toward the right against the bias of a spring 160. A portion of the pressure medium in control line 108 can escape through a small hole 159 in piston 158 and through another opening 161. Control line 108 is under pressure when the drive is idling (lever 88 positioned at N) and also for a time during the operation of the automatic reversing mechanism. Not until the moment in which sequence piston 111 of the reversing control member 110 latches in the position which corresponds to the position of the lever 88, is the supply of pressure medium connected to control line 108 through lines 109 and 125 or 126. While reversal takes place, the pressure in line 108 is maintained from the said moment on, by spring 160, and therewith cut-off piston 101 is subjected to pressure. Consequently, the higher drive speeds are held locked. This pressure is maintained until piston 158 reaches the left end position, whereupon the displaced pressure medium flows slowly out through the openings 159 and 161.

It should also be noted that, when direction reversing valve 67 and the individual pistons are entirely or partially included in one or more structural units, the channels or bores within these structural units correspond to the lines in this description.

The operation of the automatic reversing mechanism will now be described in its entirety. For this purpose it will be assumed that the vehicle is moving in the second or third speed forward. The lever 88 is at V; the governor piston 59 is displaced to the left far enough to connect line 95 or lines 95 and 103 to pressure line 64 and to operate the corresponding pistons 96 and 129 or 96, 104 and 129. Further, since control piston 101 is in the position shown in the drawing, at this point in the operation, speed shifting piston 27 (second speed) or pistons 27 and 46 (third speed) are under pressure. Sequence piston 111 of the reversing control member 110 is not under pressure on either side, since preliminary control piston 129 is displaced to the left, and piston 111 is held in the corresponding (upper) end position by ball 112. Since line 99 contains fluid under pressure, speed shifting piston 92 is in its right end position so that it shuts off the supply of pressure medium through line 94 to speed shifting member 24 for the lower speed.

In this condition of drive and control, if lever 88 is moved to R, the sequence of control and shift is as follows:

Cut-off piston 101 is subjected to pressure by fluid supplied through lines 90 and 109 (lines 90 and 109 are constantly under pressure when the lever 88 is set at V or R), through line 125 (sequence piston 111 in the upper end position) and through lines 108b, 108c, and 108 which are under pressure now that lever 88 is set at R. Piston 101 shuts off the supply of pressure medium from line 64 to the speed shifting members 12 and 46 of the second or second and third speeds.

At the same time the pressure in line 108 (through lines 108e and 108d) urges stop piston 144 toward the right so that shifting piston 142 shifts toward the right when pedal 131 is depressed to operate power control member 2 for adjusting the motor to low power.

Because line 99 is without pressure in the course of shifting from the second speed, spring 93 pushes piston 92 toward the left and thereby permits the supply of pressure medium to pass from line 90, which is constantly under pressure when lever 88 is at V or R, through lines 91 and 94 to brake 24 for the lower (hydraulic) speed. The lower speed is established, the vehicle being very strongly braked by turbine wheel 15 of the torque converter 13 since wheel 15 will rotate faster than pump wheel 14.

A reversal in the direction of rotation of transmission drive shaft 37 does not yet take place, since, in the second and third speeds, pressure exists in line 95 and in lines 127 and 128, and since preliminary control piston 129 is pushed toward the left. The flow to line 119 is thereby shut off and therefore neither side of the sequence piston 111 is subjected to pressure. Sequence piston 111 therefore remains in the forward position that it previously occupied.

When the speed of planet gear carrier 6 reduces so that it comes within the range of the lower speed, piston 59 of governor 53 assumes such a position that lines 95 and 103 are without pressure. In this position, springs 97 and 105 bias control pistons 96 and 104 into the corresponding end positions. From this point on, the two higher speeds remain ineffective. At the same time, preliminary control piston 129 also moves into its right end position and permits pressure to be supplied from the pressure lines 64 and 65 to line 119; now, piston 111 is subjected to pressure from above by pressure fluid supplied through channels 78 and 79 of control disc 68 and through line 116. This fluid pressure urges piston 111 from its upper end position to its lower end position where it is latched in place. In this position pressure is transmitted from line 109 (which pressure until now had been transmitted through line 121 to exert a force on the piston 43) through line 120 and exerts a force on reversing piston 42. Piston 42 is thereby moved toward the right where friction element 39 of sleeve 38 effects the reversal of direction through spur gears 34, 35 and 36. The pressure medium displaced from line 121 escapes through throttle 122. The reverse direction is thus established. If the vehicle should still be moving forward at very low speed, the hydraulic (lower) speed permits it to be braked and the direction is reversed smoothly, without any power interruption.

Simultaneously with the downward movement of piston 111, the supply of pressure to line 108 is cut off since the line 125 will be without pressure. Accumulator 157 for the pressure medium holds lines 162 and 108 under pressure for a short time and thereby holds piston 101 in its left end position. Thus, for that length of time, the two higher speeds are still locked. The pressure from accumulator 157 cannot, of course, enter lines 108e and 108d because of check valve 152. In lines 108e and 108d the pressure is slowly reduced through throttle openings 150 and 151 while stop piston 144 moves slowly toward the left and thereby stops shifting piston 142. At this moment pedal 131 is again effective and the vehicle can now be driven in the new direction with free choice of acceleration.

It should be clear from the foregoing that the operation proceeds in a corresponding manner when shifting from reverse to forward drive. Finally, the control will be described as it operates when lever 88 is moved from position V to position R during operation of the transmission at the lower (hydraulic) speed. In the initial driving direction (forward) sequence piston 111 of reversing control member 110 is in the upper end position so that reversing piston 43 for the forward drive is under pressure. Line 125 also is supplied with fluid under pressure. When pedal 131 is operated, piston 154 of the reverse locking mechanism 153 is displaced toward the left and with it piston 129 is also displaced, although line 127 has no pressure, so that line 119 is also without pressure.

When lever 88 is shifted to V, the pressure fluid in line 125 is circulated through lines 108b, 108c and 108d to stop piston 144. This fluid pressure urges piston 144 toward the right. As a result, power control member 2 is set to low power (in case it had not been so set already). Also, with no pressure in line 147, piston 154 is moved toward the right by spring 155, line 128 loses its pressure so that pressure medium from line 118 is transmitted through line 119, channels 78 and 79, and line 116 to the upper side of sequence piston 111. Piston 42 is urged to the right by pressure fluid supplied through line 120 to thus establish the other driving direction. It will be noted that line 125 is without pressure so that stop piston 144 is no longer subjected to pressure and moves slowly to the left. However, power control member 2 is again adjusted at this time to the position of pedal 131.

If lever 88 is shifted to R when pedal 131 is released, i.e., when the engine is idling, the change in direction takes place immediately because at the moment lever 88 is shifted, line 119 is under pressure and consequently the pressure on the sequence piston 111 shifts from the lower side to the upper side along with the shifting of lever 88. In this condition, stop piston 144 is subjected to practically no pressure at all, or at least only briefly.

Figure 2:
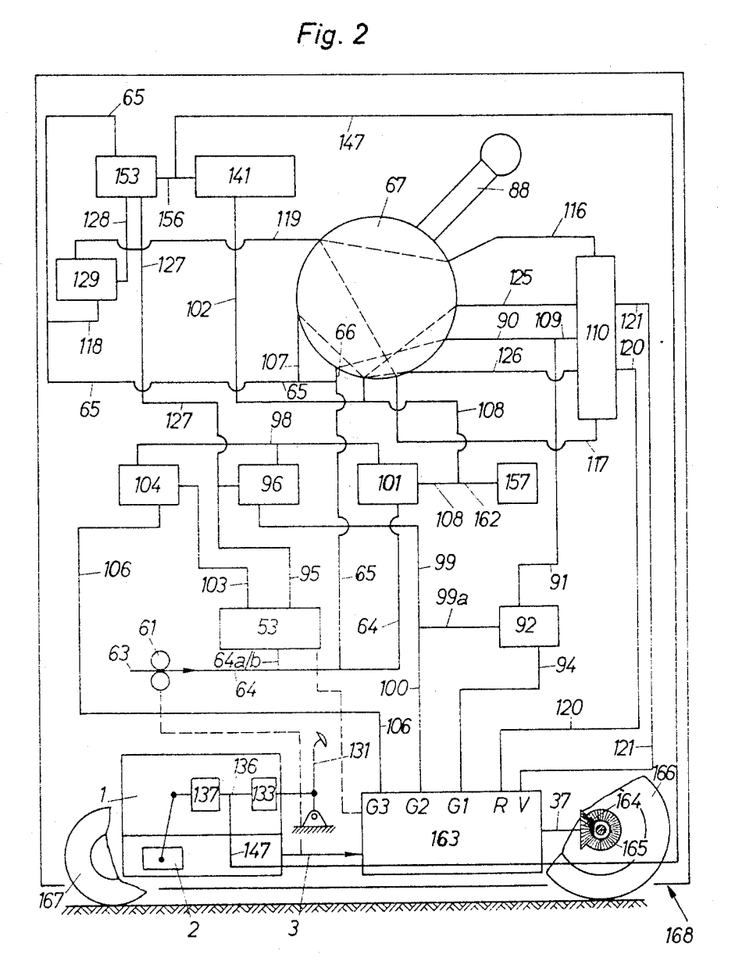
FIGURE 2 is a simplified diagrammatic view of the shifting means for the transmission shown in FIGURE 1.

In FIGURE 2 the transmission and the control mechanism of FIGURE 1 is repeated, schematically and simplified, and the reference numerals of FIGURE 1 have been used. The apparatus with the reference numerals 4 through 49 of FIGURE 1 is designated 163 in FIGURE 2, and references reflecting the purpose thereof (G1, G2, G3, R and V) have been added at the ends of the corresponding lines. Within the direction reversing valve 67, the relevant line connections are indicated by dotted lines. Furthermore, the drive shaft 37 of the transmission 163 is connected to a road wheel 166 via a pair of bevel gears 164/165. The vehicle 168 is indicated as associated with the wheel 167.

Figures 3, 4:
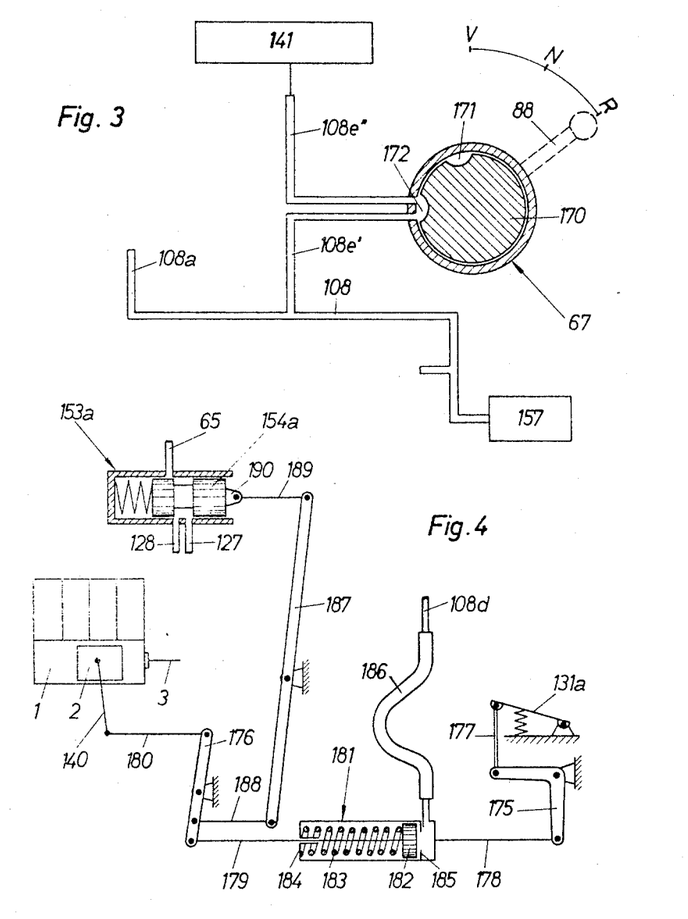
FIGURES 3 and 4 are diagrammatic fragmentary views of automatic transmissions according to further embodiments of the invention.

In FIGURE 3 the check valve 152 shown in FIGURE 1 is replaced by another device. As stated above this check valve 152 prevents pressure in the line 108a (when the lever 88 is set at N) from reaching the stop piston 144 through the line 108e, so that, when the lever 88 is set at N, the pedal 131 is effective without any influence. The device of FIGURE 3 achieves the same purpose. For that purpose the direction reversing valve 67 has a fourth shifting disc portion 170 formed with two recesses 171 and 172. Recesses 171 and 172 are so arranged that, when the lever 88 is set at V or R, the pressure in the line 108 is transmitted through lines 108e' and 108e" (these lines correspond to line 108e in FIGURE 1) to the stop piston 144 (FIGURE 1) and can subject this piston to pressure; on the other hand, the connection between the lines 108e' and 108e" is cut off when the lever 88 is set at N.

Not only is the check valve 152 (FIGURE 1) replaced by this means, but a further advantage is gained, namely when, from an idling position (lever 88 set at N), that direction of travel is established which had obtained before shifting to N. This series of shifts occurs, for example, when a caterpillar loader is driven up to a truck to load the latter, in which case the lever 88 is operated several times to put the caterpillar in position accurately. With the engine running at high speed, shocks to the drive mechanism would be unavoidable. It would be very difficult to position the caterpillar vehicle accurately. It requires too much time to throttle the motor first, especially since full power is required to unload the caterpillar and drive it away again. Here the last-described means provides assistance. With the lever 88 at V or R and with the sequence piston 111 at a position agreeing with the position of the lever, a connection is established, through the connection between lines 108e' and 108e", between the accumulator 157 and the device 141 for setting the power control member to low power. Since the accumulator 157 is filled when the lever 88 is set at N, it accordingly delivers oil pressure for a short time when the lever 88 is moved to V or R and operates this device 141 so that the engine speed is first throttled and a jerky drive of the vehicle in the previous direction of operation is prevented.

Finally, in FIGURE 4 the power control member 2 of FIGURE 1, operable by means of the lever 140, is connected via levers 175 and 176 and a mechanism 177, 178, 179 and 180 to a pedal 131a. A device 181 for reducing the power of the engine is provided between the rods 178 and 179. This device has a piston 182 which is urged by a spring 183 against an abutment 185 connected to the spring abutment 184. Thus, device 181 is so connected that piston 182 is positively connected with lever 140 of power control member 2 and abutment 184 of the spring 183 is positively connected with pedal 131a and compression of spring 183 results in a reduction of the engine load (rotating lever 140 in the counterclockwise direction). This compression is caused when pressure in line 108 (FIGURE 1), through a portion 108d of that line and a hose 186, forces piston 182 against the bias of spring 183 and the pressure in control line 108d overcomes the force of spring 183. Piston 182 is thereby moved to the left and rotates lever 140 in the counterclockwise direction, whereby the engine power is reduced. Pressure exists in the control line 108 or 108d, as explained above, during reversal of direction and when the previous direction of travel is shifted to neutral. The device 181 accordingly permits the motor load to be influenced independently of the operating pedal, even with a mechanically operated power control member.

The hydraulically or pneumatically operated reverse locking mechanism 153 with the lines 65, 127 and 128 is also operated mechanically when power control member 2 is operated mechanically in accordance with FIGURE 4. For this purpose the piston 154a of the reverse locking mechanism 153a is provided with a boss 190 and is connected with lever 176 via lever 187 and rods 189 and 188. When power control member 2 is set to low power in the manner shown, lines 127 and 128 are connected with each other and when that member is set to higher power, the lines 65 and 128 are connected to each other. The function of the reverse locking mechanism has already been explained above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an automatic multiple speed transmission having a power input shaft and a power output shaft, means including change speed means coupling said output shaft to said input shaft and means for selectively reversing the direction of output shaft rotation and comprising a low ratio speed and at least one higher ratio speed, said reversing means being operated by a manual shift member, said low ratio speed including at least a Foettinger type fluid drive for transmitting power in at least one direction of said output shaft, means responsive to the speed of said output shaft for effecting a change in the transmission ratio of said change speed means in at least one direction of output shaft rotation to automatically upshift and downshift between said low ratio speed and said at least one higher ratio speed, and means responsive to actuation of said shift member to automatically render the means operably associated with said at least one higher ratio speed inoperative and to automatically actuate the means operably associated with said low ratio speed for automatically effecting a downshift to said low ratio speed before permitting said reversing means to effect a reversal in the direction of output shaft rotation and then rendering the means for at least one higher ratio speed operative.

2. In an automatic multiple speed transmission having a power input shaft and a power output shaft,
   (a) means including change speed means coupling said output shaft to said input shaft and means for selectively reversing the direction of output shaft rotation and comprising a low ratio speed and at least one higher ratio speed,
   (b) said reversing means being operated by a manual shift member,
   (c) said low ratio speed including at least a Foettinger type fluid drive for transmitting power in at least one direction of said output shaft,
   (d) means responsive to the speed of said output shaft for effecting a change in the transmission ratio of said change speed means in at least one direction of output shaft rotation to automatically upshift and downshift between said low ratio speed and said at least one higher ratio speed, and
   (e) means responsive to actuation of said shift member to automatically render the means operably associated with said at least one higher ratio speed inoperative and to automatically actuate the means operably associated with said low ratio speed for automatically effecting a downshift to said low ratio speed before permitting said reversing means to effect a reversal in the direction of output shaft rotation and then rendering the means for said at least one higher ratio speed operative.

3. In an automatic multiple speed transmission having a power input shaft and a power output shaft,
   (a) means coupling said output shaft to said input shaft including change speed means and direction reversing means actuatable to reverse the direction of rotation of said output shaft,
   (b) said change speed means comprising a plurality of speed shifting devices actuatable to respectively provide a low ratio speed power train and at least one higher ratio speed power train,
   (c) a Foettinger type fluid drive forming a part of said low ratio speed power train for transmitting power in at least one direction of rotation of said output shaft,
   (d) means including a manual shift member for selectively actuating said reversing means to reverse the direction of rotation of said output shaft,
   (e) a speed governor responsive to the speed of said output shaft and being operably connected to said speed shifting devices to effect a change in the transmission speed ratio of said change speed means in at least one direction of rotation of said output shaft by upshifting and downshifting between the low ratio speed and at least one higher ratio speed respectively provided by said low ratio speed power train and said at least one higher ratio speed power train, and
   (f) control means operatively associated with said reversing means, said shifting devices, and said manual shifting member for automatically effecting a downshift to said low ratio speed by rendering the speed shifting device associated with said higher ratio speed inoperative before permitting actuation of said reversing means by said manual shift member and then rendering the shifting device associated with said high ratio speed operatively responsive to said governor again after said reversing means is actuated.

4. In an automatic multiple speed transmission having a power input shaft and a power output shaft, (a) means coupling said output shaft to said input shaft including change speed means and direction reversing means, said direction reversing means being actuatable to reverse the direction of rotation of said output shaft, (b) said change speed means comprising a plurality of speed shifting devices respectively providing a low ratio speed power train and at least one higher ratio speed power train, (c) a Foettinger type fluid drive forming a part of said low ratio speed power train for transmitting power in at least one direction of rotation of said output shaft, (d) a first fluid motor having a direction control piston displaceable in opposite directions by fluid pressure, (e) means responsive to displacement of said direction control piston in either direction to actuate said direction reversing means for reversing the direction of output shaft rotation, (f) a fluid control circuit including a fluid pressure supply source, (g) control valve means connected in said fluid control circuit between said supply source and said first fluid motor and having a manual control member selectively shiftable between forward, reverse, and neutral positions, said valve means being operable when said manual control member is shifted to either the forward or reverse positions to permit delivery of fluid under pressure for displacing said direction control member respectively in opposite directions, (h) second and third fluid motors respectively having second and third control pistons, said second and third pistons being displaceable to respectively actuate the speed shifting devices providing said low ratio speed power train and said at least one higher ratio speed power train, (i) a speed governor responsive to the speed of said output shaft, (j) means under the control of said govenor for automatically effecting an upshift and downshift between the low ratio speed and at least one higher ratio speed respectively provided by said low ratio speed power train and said at least one higher ratio speed power train, and including means for so controlling delivery of fluid under pressure to said second and third pistons that pressurized fluid is delivered to actuate said second piston whenever the supply of pressurized fluid to said third piston is blocked, (k) a fourth fluid motor having a cut-off piston displaceable to block delivery of fluid under pressure for actuating said third control piston, (l) a fluid conduit connected between said control valve means and said fourth fluid motor for supplying fluid pressure to actuate said cut-off piston, (m) means for providing fluid pressure in said fluid conduit to actuate said cut-off piston when the positions of said direction control piston and said manual shift member correspond to opposite directions of output shaft rotation, and (n) means under the control of said governor for permitting delivery of pressurized fluid to actuate said direction control piston only when the speed of said output shaft corresponds to said low ratio speed.

5. The automatic multiple speed transmission defined in claim 4 wherein said last-mentioned means comprises:

(a) a fifth fluid motor having a speed governor piston and resilient means biasing said governor piston in a predetermined direction, (b) means operatively connecting said governor to displace the speed governor piston against the bias of said resilient means in response to rotation of said output shaft, (c) a sixth fluid motor having a preliminary control piston, (d) a second fluid conduit connected between said fifth and sixth fluid motors, (e) said speed governor piston being so arranged relative to said second fluid conduit that pressure fluid is permitted to be transmitted through said second fluid conduit to actuate said preliminary piston only when the position of said governor piston corresponds to the higher ratio speed of said output shaft, and (f) a third fluid conduit connected between said sixth fluid motor and said control valve means, (g) said preliminary control piston being effective to block the supply of pressurized fluid to said third fluid conduit only when there is fluid pressure in said second fluid conduit.

6. In an automatic multiple speed transmission having a power input shaft and a power output shaft, (a) means coupling said output shaft to said input shaft including change speed means and direction reversing means, said direction reversing means being actuatable to reverse the direction of rotation of said output shaft, (b) said change speed means comprising a plurality of speed shifting devices respectively providing a low ratio speed power train and at least one higher ratio speed power train, (c) a Foettinger type fluid drive forming a part of said low ratio speed power train for transmitting power in at least one direction of rotation of said output shaft, (d) a first fluid motor having a direction control piston displaceable in opposite directions by fluid pressure, (e) means responsive to displacement of said direction control piston in either direction to actuate said direction reversing means for reversing the direction of output shaft rotation, (f) a fluid control circuit including a fluid pressure supply source, (g) control valve means connected in said fluid control circuit between said supply source and said first fluid motor and having a manual control member selectively shiftable between forward, reverse, and neutral positions, said valve means being operable when said manual control member is shifted to either the forward or reverse positions to permit delivery of fluid under pressure for displacing said direction control member respectively in opposite directions, (h) second and third fluid motors respectively having second and third control pistons, said second and third control pistons being displaceable by fluid pressure to respectively actuate the speed shifting devices providing said low ratio speed power train and said at least one higher ratio speed power train, (i) means including a speed governor responsive to the speed of said output shaft for controlling the supply of pressurized fluid from said source to said second and third fluid motors and permitting delivery of pressurized fluid for actuating said third fluid motor only when said output shaft reaches a predetermined speed, (j) said third control piston being so disposed in said circuit that it blocks delivery of pressurized fluid to said second fluid motor when it is displaced by fluid pressure applied thereto whereby upshifting and downshifting between the low ratio speed and the high ratio speed respectively provided by said low ratio speed power train and said high ratio speed power train is automatically effected in response to the speed of said output shaft, (k) a fourth fluid motor having a cut-off piston displaceable to block delivery of fluid under pressure for actuating said third control piston, (l) a fluid conduit connected between said control valve means and said fourth fluid motor for supplying fluid pressure to actuate said cut-off piston, (m) means for providing fluid pressure in said fluid conduit to actuate said cut-off piston when the positions of said direction control piston and said manual shift member correpond to opposite directions of output shaft rotation, and (n) means under the control of said governor for permitting delivery of pressurized fluid to actuate said direction control piston only when the speed of said output shaft corresponds to said low ratio speed.

7. In combination, (a) an engine having a power supply shaft, (b) an adjustable power control member for controlling the power supplied by said shaft, (c) manual means for selectively operating said power control member, and (d) a multiple speed transmission having an input shaft coupled to said power output shaft and an output shaft, said transmission comprising:

(e) means coupling said output shaft to said input shaft including change speed means and direction reversing means, said direction reversing means being actuatable to reverse the direction of rotation of said output shaft, (f) said change speed means comprising a plurality of speed shifting devices actuatable to respectively provide a low ratio speed power train and at least one higher ratio speed power train, (g) a Foettinger type fluid drive forming a part of said low ratio speed power train for transmitting power in at least one direction of rotation of said output shaft, (h) means including a manual shift member for selectively actuating said reversing means to reverse the direction of rotation of said output shaft, (i) a speed governor responsive to the speed of said output shaft and being operably connected to said speed shifting devices to effect a change in the transmission speed ratio of said change speed means in at least one direction of rotation of said output shaft by upshifting and downshifting between the low ratio speed and at least one higher ratio speed respectively provided by said low ratio speed power train and said at least one higher ratio speed power train, and (j) control means operatively associated with said reversing means, said shifting devices, and said manual shifting member for automatically effecting a downshift to said low ratio speed by rendering the speed shifting device associated with said higher ratio speed inoperative before permitting actuation of said reversing means by said manual shift member and then rendering the shifting device associated with said high ratio speed operatively responsive to said governor again after said reversing means is actuated, (k) said control means being operatively connected to said power control member to set said control member to a position for reducing the power output at said power supply shaft independently of operation by said manual means when said manual control member is shifted to reverse the direction of output shaft rotation.

8. In combination, (a) an engine having a power supply shaft, (b) an adjustable power control member for controlling the power supplied by said shaft, (c) first fluid motor means having an actuating piston operably connected to said power control member and being displaceable by fluid pressure to adjust the position of said power control member, (d) a closed fluid circuit connected to said fluid motor means for applying fluid pressure to said actuating piston, (e) manual means for selectively controlling the pressure of fluid in said closed fluid circuit, and (f) a multiple speed transmission having an input shaft coupled to said power output shaft and an output shaft, said transmission comprising:

(g) means coupling said output shaft to said input shaft including change speed means and direction reversing means, said direction reversing means being actuatable to reverse the direction of rotation of said output shaft, (h) said change speed means comprising a plurality of speed shifting devices respectively providing a low ratio speed power train and at least one higher ratio speed power train.

(i) second and third fluid motors respectively having second and third control pistons, said second and third control pistons being displaceable by fluid pressure to respectively actuate the speed shifting devices providing said low ratio speed power train and said at least one higher ratio speed power train, (j) a Foettinger type fluid drive forming a part of said low ratio speed power train for transmitting power in at least one direction of rotation of said output shaft, (k) a first fluid motor having a direction control piston displaceable in opposite directions by fluid pressure, (l) means responsive to displacement of said direction control piston in either direction to actuate said direction reversing means for reversing the direction of output shaft rotation, (m) a fluid control circuit including a fluid pressure supply source, (n) control valve means connected in said fluid control circuit between said supply source and said first fluid motor and having a manual control member selectively shiftable between forward, reverse, and neutral positions, said valve means being operable when said manual control member is shifted to either the forward or reverse positions to permit delivery of fluid under pressure for displacing said direction control piston respectively in opposite directions, (o) a speed governor responsive to the speed of said output shaft, (p) means under the control of said governor for automatically effecting an upshift and downshift between the low ratio speed and at least one higher ratio speed respectively provided by said low ratio speed power train and said at least one higher ratio speed power train and including means for so controlling delivery of fluid under pressure to said second and third pistons that pressurized fluid is delivered to actuate said second piston whenever the supply of pressurized fluid to said third piston is blocked, (q) a fourth fluid motor having a cut-off piston displaceable by fluid pressure to block delivery of fluid under pressure for actuating said third control piston, (r) a first fluid conduit connected between said control valve means and said fourth fluid motor for supplying fluid pressure to actuate said cut-off piston, (s) means for providing fluid pressure in said first fluid conduit to actuate said cut-off piston when the positions of said direction control piston and said manual shift member correspond to opposite directions of output shaft rotation, (t) means under the control of said governor for permitting delivery of pressurized fluid to actuate said direction control piston only when the speed of said output shaft corresponds to said low ratio speed, and (u) control means operable in response to manipulation of said manual control member for adjusting said power control member to a position for reducing the power output at said power shaft independently of operation of said manual means; said control means comprising:

(v) a fifth fluid motor having a shift piston and a stop piston, said shift and stop pistons being axially displaceable and having opposed engageable ends, and spring means biasing said stop piston into engagement with said shift piston to displace said shift piston to a predetermined position, (w) a second fluid conduit connected between said valve means and fifth fluid motor for delivering fluid only to said opposed end of said stop piston, (x) said valve means being operable to establish fluid communication between said first fluid conduit and said second fluid conduit to apply fluid pressure for shifting said stop piston against the bias of said spring means when said manual control member is shifted to effect a reversal of output shaft rotation, and (y) a third fluid conduit forming a part of said closed fluid circuit and establishing fluid communication between the end of said actuating piston to which fluid pressure is applied and the other end of said shift piston opposite from said opposed end thereof, (z) said shift and stop pistons being so arranged in cooperation with each other that said stop piston permits fluid pressure in said closed circuit to displace said shift piston only when said stop piston is displaced by application of fluid pressure to the opposed end thereof, (aa) said shift piston being cooperable when displaced toward said stop piston to prevent fluid pressure in said closed fluid circuit from increasing above a predetermined magnitude by operation of said manual means, thereby maintaining said power control member in predetermined position.

9. The combination defined in claim 8 wherein said stop and shift piston are axially aligned and said opposed ends comprise abuttable projections.

10. The combination defined in claim 8 comprising means preventing actuation of said direction control piston when pressure in said closed fluid circuit is above a predetermined magnitude.

11. The combination defined in claim 8 comprising:
(a) a fourth fluid conduit connected between said second circuit and said first conduit in parallel relation with said valve means, and
(b) a check valve disposed in said fourth fluid conduit for permitting fluid flow only from said second fluid conduit to said first fluid conduit.

12. The combination defined in claim 8 comprising:
(a) fluid accumulator means in fluid communication with said first fluid conduit, and
(b) means for filling said accumulator means with pressurized fluid when said manual control member is shifted to neutral position and for delivering the quantity of pressurized fluid in said accumulator means to said fifth fluid motor to displace said stop piston against the bias of said spring means when said manual control member is shifted from neutral position to a position for effecting reversal of output shaft rotation.

References Cited by the Examiner
UNITED STATES PATENTS

| 2,755,688 | 7/1956 | Swennes | 74—688 |
| 2,971,405 | 2/1961 | Flinn | 74—752 |

DAVID J. WILLIAMOWSKY, *Primary Examiner.*

J. R. BENEFIEL, *Assistant Examiner.*